US012784716B2

(12) United States Patent
Knight

(10) Patent No.: US 12,784,716 B2
(45) Date of Patent: Nov. 3, 2026

(54) APPARATUS AND METHOD FOR CHIME DAMPENING

(71) Applicant: Hayes-Ivy Manufacturing, Inc., New Tripoli, PA (US)

(72) Inventor: Peter Knight, Ft. Lauderdale, FL (US)

(73) Assignee: Hayes-Ivy Manufacturing, Inc., New Tripoli, PA (US)

( * ) Notice: Subject to any disclaimer, the term of this patent is extended or adjusted under 35 U.S.C. 154(b) by 347 days.

(21) Appl. No.: 18/357,831

(22) Filed: Jul. 24, 2023

(65) Prior Publication Data

US 2025/0037685 A1 Jan. 30, 2025

(51) Int. Cl.

*G10D 13/14* (2020.01)
*G10D 13/08* (2020.01)
*G10K 1/10* (2006.01)

(52) U.S. Cl.

CPC ............. *G10D 13/14* (2020.02); *G10D 13/08* (2013.01); *G10K 1/10* (2013.01)

(58) Field of Classification Search

CPC .......... G10D 13/14; G10D 13/08; G10D 3/00; G10D 1/00; G10K 1/10
See application file for complete search history.

(56) References Cited

U.S. PATENT DOCUMENTS

| | | | |
|---|---|---|---|
| 4,967,633 | A | 11/1990 | Jewell, Jr. |
| 7,156,338 | B2 | 1/2007 | Schartner |
| 8,863,813 | B1 | 10/2014 | Pagles |
| 9,024,161 | B1 | 5/2015 | Strong |
| 10,062,365 | B2 | 8/2018 | Finigan |
| 10,847,132 | B1 | 11/2020 | Miller |
| 11,996,072 | B2 | 5/2024 | Chiang |

FOREIGN PATENT DOCUMENTS

| | | | | |
|---|---|---|---|---|
| CH | 695640 | A5 * | 7/2006 | ............. G10K 1/067 |
| CN | 211654289 | U | 10/2020 | |
| CN | 212230060 | U | 12/2020 | |
| CN | 212847667 | U | 3/2021 | |
| CN | 212907050 | U | 4/2021 | |
| CN | 213070605 | U | 4/2021 | |
| IN | 202111053410 | A * | 11/2021 | ............. G10K 1/067 |

OTHER PUBLICATIONS

Astarin, Astarin Wind Chimes Outdoor Large Deep Tone, 48 Inch Sympathy Wind Chimes Outdoor, Memorial Wind Chimes With 5 Big Heavy Tuned Tubes, Outdoor Decor for Garden, Patio, Bronze (Amazon.com Product Listing, archived PDF) Accessed Apr. 25, 2023.

* cited by examiner

*Primary Examiner* — Kimberly R Lockett
(74) *Attorney, Agent, or Firm* — Inspired Idea Solutions Law Firm

(57) ABSTRACT

A method and apparatus is disclosed for chime damping. A chime includes a suspension element from which hangs a sound generating element, such as one or more chime tubes or a side wall of a bell chime. A cord retractor is affixed to the suspension element and a center cord is secured to the cord retractor to be windable and unwindable between retracted and extended positions. A damper, a clapper, and/or a windcatcher are affixed to the center cord. Moving the center cord between retracted and extended positions alters the relative position of the damper, the clapper, and/or the windcatcher with respect to the suspension element and the sound generating element to cause noise generation or noise damping.

20 Claims, 5 Drawing Sheets

APPARATUS AND METHOD FOR CHIME DAMPENING

FIELD

The present disclosure generally relates to wind chimes, and more particularly to use chime dampening.

BACKGROUND

Chimes have existed in one form or another for only a mere three thousand years or more. Whether it was the Feng-lings of China circa 1100 B.C., the Tintinabulums of the Roman empire, the Netherlandic glass chimes, or the furin of Japan (complete with a Gaiken, or bell shaped exterior, a Zetsu, or clapper, and Tanzaku, or colored stripes of paper that fluttered in the summer breeze), chimes have taken many forms over the ages.

Anciently chimes were used for ceremonial purposes or the noises they generated were intended to fulfill the superstitions of the user's imagination, such as maximizing the flow of chi, bringing good fortune, warding off evil spirits, and so forth. In modern times, chimes have been used decoratively and for production of musical tones (e.g., chords). Thus, it has been the general purpose of chimes to produce noise in one form or another for a very long time.

Therefore, a need exists to allow a user of a chime to regulate noise production in a reliable and simple construction.

SUMMARY

A chime comprises a suspension element, a sound generating element extending from the suspension element, a cord retractor secured to the suspension element, a center cord secured to the cord retractor, the center cord windable and unwindable on the cord retractor between retracted and extended positions, a clapper secured to the center cord, and a windcatcher secured to the center cord below the clapper.

A chime comprises a suspension element, a sound generating element extending from the suspension element, a cord retractor secured to the suspension element, a center cord secured to the cord retractor, the center cord windable and unwindable on the cord retractor between retracted and extended positions, a damper secured to the center cord, a clapper secured to the center cord, and a windcatcher secured to the center cord below the damper and below the clapper.

A method for chime dampening comprising configuring a chime having a suspension element, a sound generating element extending from the suspension element, a cord retractor secured to the suspension element, a center cord secured to the cord retractor, the center cord windable and unwindable on the cord retractor between retracted and extended positions, a clapper secured to the center cord, and a windcatcher secured to the center cord below the clapper, moving the center cord from the retracted position to the extended position, and moving the center cord from the extended position to the retracted position.

BRIEF DESCRIPTION OF THE DRAWINGS

Various aspects and advantages will become apparent upon review of the following detailed description and upon reference to the drawings in which.

DETAILED DESCRIPTION

The following disclosure includes a method and apparatus for dampening noise from a chime. The chime may be connected to a structural element such that the chime may hang from the structural element. Wind or other motive force may cause the chime to sway in the wind and generate noise as a result of contact between elements of the chime. A windcatcher or pull fob may be positioned to catch the wind to cause the chime to sway.

A sound generating element (e.g., chime tubes or bell chimes) may be suspended from the chime. A clapper may be suspended from the chime in close proximity (e.g., less than three inches) to the sound generating element, such that the clapper may contact the chime tubes and/or bell chimes to generate noise. Noise may be generated any number of frequencies, and at any number of sound pressures, and at any loudness, and having any level of quality.

The clapper may be suspended from a center string. The clapper may be affixed to the center string. The center string may be affixed to a cord retractor (e.g., a spring loaded cord retractor), such that the center string may be retracted onto the cord retractor, or pulled out of the cord retractor to any length up to the full length of the center string. The clapper may be moved by virtue of the extension and/or retraction of the center string on the cord retractor.

The clapper may be positioned between the chime tubes and/or may be positioned within the bell chimes to allow the clapper to impact the chime tubes and/or bell chimes to create noise. The clapper may be positioned away from the chime tubes and/or bell chimes (e.g., below the chime tubes and/or bell chimes) to prevent the clapper from impacting the chime tubes and/or bell chimes.

A damper may be affixed to the center string. The damper may be positioned between the chime tubes and/or bell chimes to prevent the chime tubes and/or bell chimes from knocking into each other (e.g., damping the noise) during excessive movement of the chime (e.g., due to wind gusts). The damper may be secured to the center string above the clapper. The damper may be raised or lowered with the retraction and/or extension of the center string to allow for generation of noise and/or damping of noise.

Figure 1:
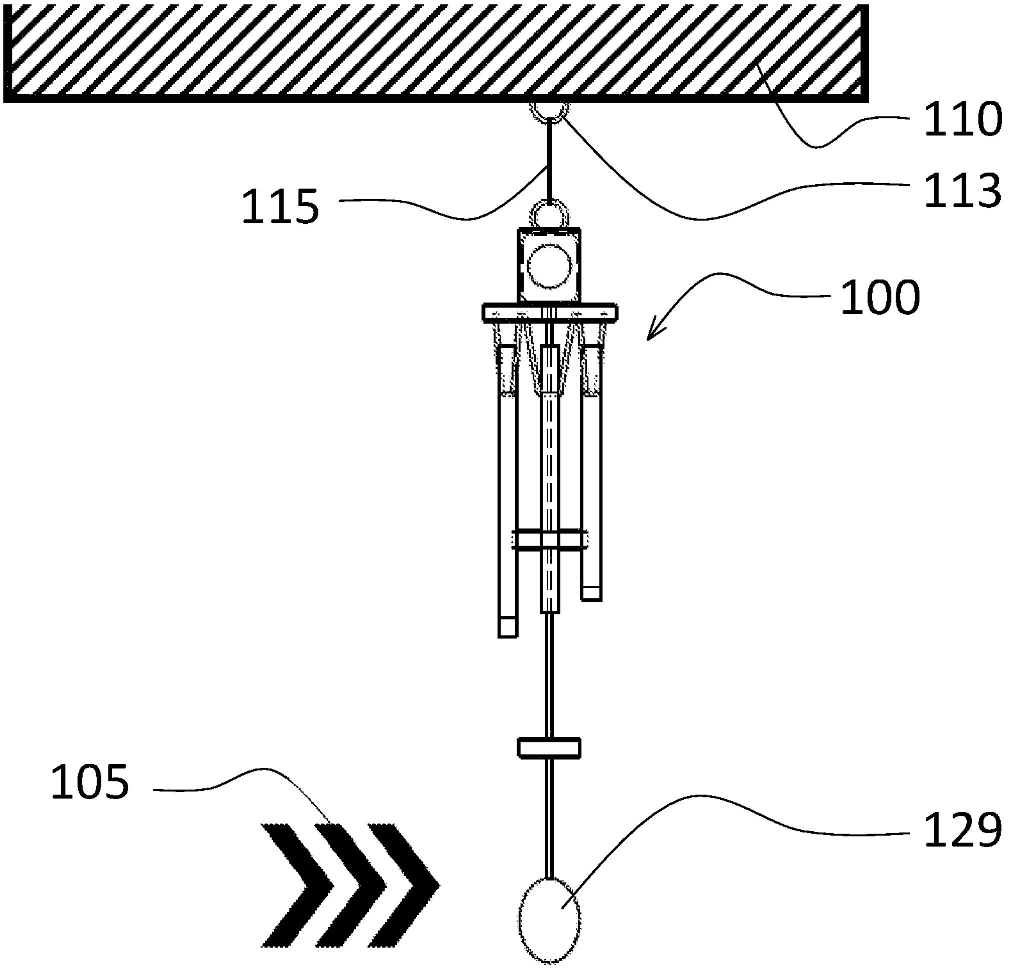
FIG. 1 illustrates a chime suspended from structural element.

FIG. 1 illustrates a chime 100 suspended from structural element 110. Structural element 110 may be a portion of a fixed structure (e.g., a house) or of a moveable structure (e.g., a boat). A connection point 113 may extend from the structural element 110 to enable connection of chime 100 (e.g., a hook, U-bolt, ring, screw, nail, loop, clamp, or other fastening means).

Chime 100 may be secured directly to connection point 113 or may be connected by means of an intermediate fastening element 115 (e.g., string, rope, cable, chain, or other fastening means) as exemplified in FIG. 1. It may be desirable for intermediate fastening element 115 to be relatively short, or exceedingly long depending on the desired position of Chime 100 with respect to structural element 110. Optimal positioning of Chime 100 may enable easier access by the user and/or greater accessibility to wind control for noise generation. It is contemplated that intermediate fastening element 115 may incorporate a hoist system to enable adjustment of the relative position of Chime 100 with respect to structural element 110 during use and/or stored conditions.

Wind 105 may blow chime 100 and/or a user may interact with chime 100 to cause it to sway and/or generate noise. Wind 105 may exert a force on chime 100 (e.g., on windcatcher 129) to cause movement of chime 100. Windcatcher 129 may be formed of metal, plastic, wood, or of composite. Windcatcher 129 may be shaped to catch wind 105. Windcatcher 129 may be circular, ovular, square, rectangular, triangular, of polygonal shape, or ringed shape, and so forth. Windcatcher 129 may have relatively small cross-section. Windcatcher may have a relatively large length and height, but a relatively small width, such that the length and height may be substantially larger in dimension that the width.

Figure 2:
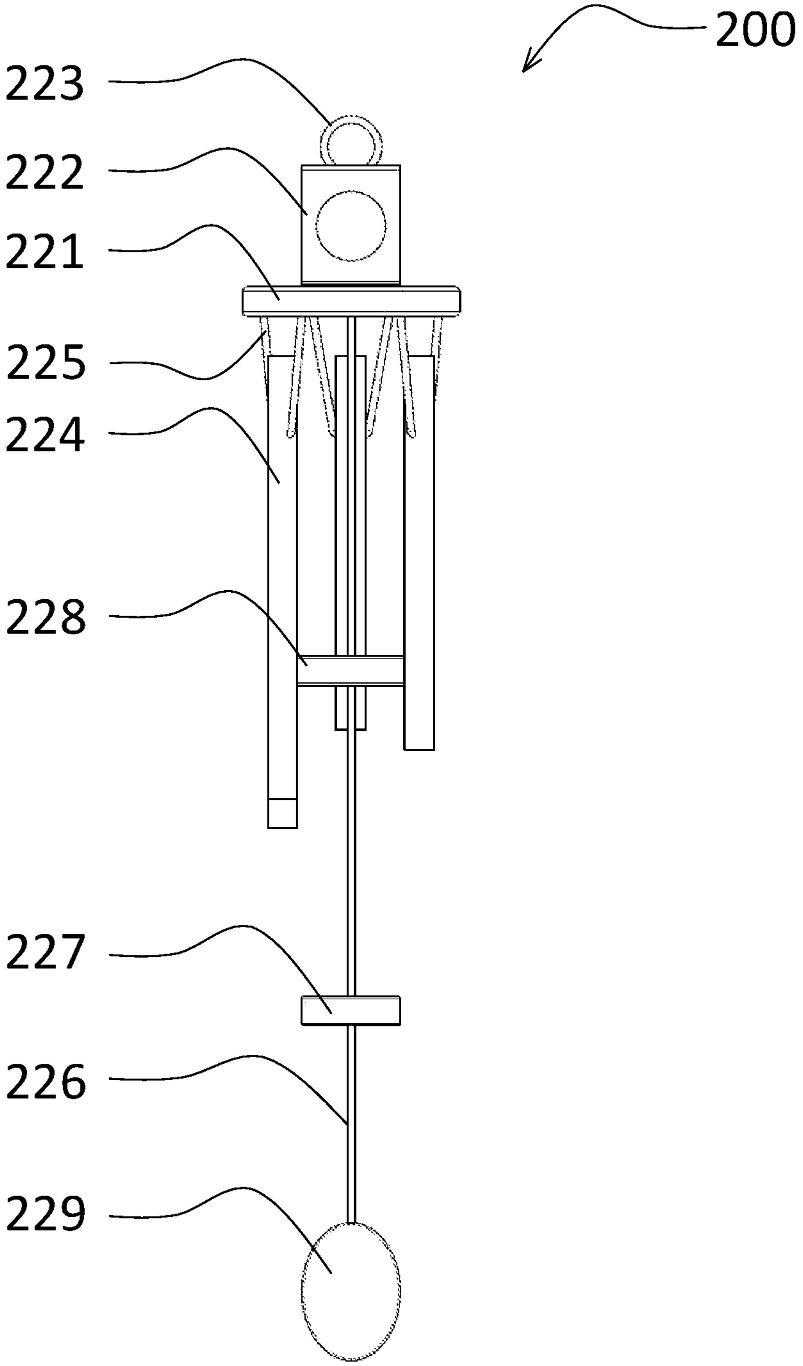
FIG. 2 illustrates a wind chime in an extended position.

FIG. 2 illustrates a wind chime 200 in an extended condition. Wind chime 200 may include a connection point 223 to enable wind chime 200 to be secured to a structure (e.g., structural element 110 of FIG. 1). Connection point 223 may take the form of a hook, U-bolt, ring, screw, nail, loop, clamp, or other fastening means.

Wind chime 200 may include a suspension element 221 for providing structure for the other elements of wind chime 200. A cord retractor 222 may be secured to suspension element 221. Connection point 223 may be secured directly to suspension element 221, or indirectly by securement to cord retractor 222.

Chime tubes 224 may be secured to suspension element 221. Chime tubes 224 may hang below suspension element 221. Chime tubes 224 may include one or more chime tubes (e.g., 1, 2, 3, 4, 5, 6, 7, 8, 9, or more chime tubes). Chime tubes 224 may include three chime tubes as exemplified in FIG. 2. Chime tubes 224 may be suspended from suspension element 221 by one or more tube strings 225. Chime tubes 224 may experience motion relative to suspension element 221 due to wind (e.g., wind 105 of FIG. 1) or resulting from user interaction with wind chime 200.

Chime tubes 224 may have similar or different dimensions. Chime tubes 224 may be formed as hollow cylinders having a length and a diameter. A person of ordinary skill in the art will appreciate that other formations are possible without departing from the spirit and scope of the present disclosure. Chime tubes 224 may have similar diameters and different lengths. Chime tubes 224 may have similar lengths and different diameters. Dimensions of chime tubes 224 may correspond to tones, such that each chime tube 224 may correspond to similar or different tones. The combination of chime tubes 224 used in a single wind chime 200 may result in a particular combination of tones (e.g., to achieve a chord during noise generation).

Cord retractor 222 may be positioned above and/or below suspension element 221 (e.g., exemplified as above in FIG. 2). A center cord 226 may be secured to cord retractor 222. Center cord 226 may wind up within cord retractor 222. Center cord 226 may unwind from within cord retractor 222. A person of ordinary skill in the art will appreciate the inner-workings of a cord retractor.

Nevertheless, the winding and unwinding of center cord 226 may be accomplished on a spool configured for rotation within cord retractor. The spool may be biased into rotation (e.g., biased into a winding motion) by a spring, a motor, a counterweight, or other biasing device. A lock on and/or within the cord retractor may catch the center cord 226 to prevent center cord 226 from winding onto the spool when locked. The lock may be capable of being engaged and released as desired during use and/or storage of wind chime 200.

A clapper 227 may be secured to center cord 226. Clapper 227 may be formed of rigid material (e.g., wood) such that clapper 227 may strike chime tubes 224 to cause noise generation (e.g., generation of one or more tones, where each tone originates from one of the chime tubes 224). Clapper 227 may be dimensioned to fit between chime tubes 224 without touching chime tubes 224. Clapper 227 may be dimensioned to be smaller than the space between chime tubes 224 so that while swinging on center cord 226 clapper 227 may strike chime tubes 224 with enough force to generate noise (e.g., a chord, or combination of tones).

A damper 228 may be secured to center cord 226. Damper 228 may be formed of elastic material (e.g., rubber) such that damper 228 may strike chime tubes 224 without causing noise generation and/or causing substantially reduced noise generation (e.g., less than ⅕ the noise generated by clapper 227). Damper 228 may be dimensioned to fit between chime tubes 224 with and/or without touching chime tubes 224. Damper 228 may be dimensioned to be about the same size as the space between chime tubes 224 so that while swinging on center cord 226 damper 228 may rub against chime tubes 224 and/or strike chime tubes 224 with minimal force to minimize and/or dampen noise generation.

A windcatcher 229 may be secured to center cord 226. Windcatcher 229 may be dimensioned to catch wind (e.g., wind 105 of FIG. 1). Upon catching wind, windcatcher 229 may begin to experience a force and may begin to move with respect to suspension element 221 (e.g., windcatcher 229 swinging as a pendulum via center cord 226). Movement of windcatcher 229 with respect to suspension element 221, and the corresponding movement of center cord 226 may also cause movement of clapper 227 and/or damper 228. Windcatcher 229, clapper 227 and damper 228 may move evenly with each other during motion, or may move erratically with respect to each other during motion.

FIG. 2 exemplifies center cord 226 in an extended position (e.g., corresponding to wind chime 200 being in the extended condition). In the extended position, damper 228 may be positioned at a location along center cord 226 so as to be situated between chime tubes 224. In the extended position, clapper 227 may be positioned at a location along center cord 226 so as to be situated substantially below chime tubes 224. In the extended position, windcatcher 229 may be positioned at a location along center cord 226 so as to be situated substantially below chime tubes 224. Thus, in this example, windcatcher 229 may be positioned at the bottom of center cord 226, clapper 227 may be positioned above windcatcher 229, and damper 228 may be positioned above clapper 227 and windcatcher 229. In this configuration the extended position of center cord 226 corresponds to a damped configuration wherein wind chime 200 may be prevented from noise generation.

A person of ordinary skill in the art will appreciate that clapper 227 and damper 228 may be positioned differently than as exemplified in FIG. 2. Clapper 227 may be positioned above damper 228 such that when center cord 226 is in an extended position clapper 227 may be situated between chime tubes 224. In this configuration the extended position of center cord 226 corresponds to an undamped configuration wherein wind chime 200 may be allowed to produce noise generation.

It is also conceivable that where clapper 227 is positioned above damper 228, the damper 228 and windcatcher 229 may be combined together into a single element having both the characteristics of damper 228 and windcatcher 229 as presented in this disclosure. In this configuration, the combined damper/windcatcher would be dimensioned and shaped to catch wind when center cord 226 is in the extended position and be able to dampen noise generation when center cord 226 is moved into the retracted position (e.g., the combined damper/windcatcher is repositioned to be situated between chime tubes 224).

Figure 3:
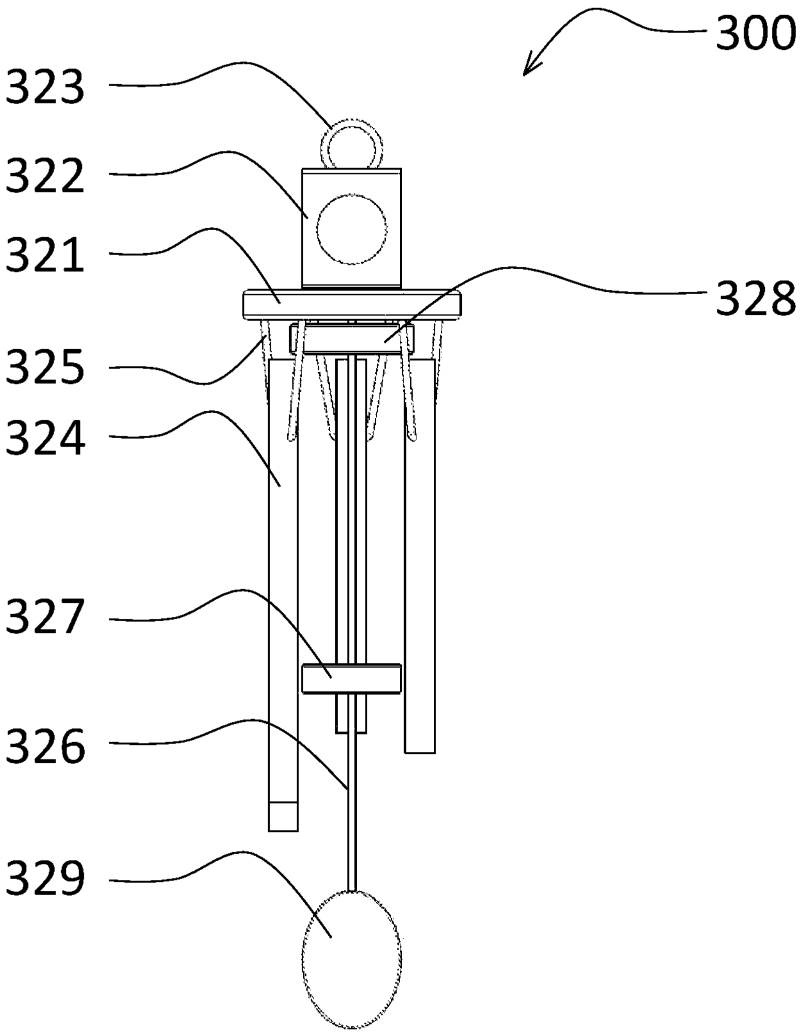
FIG. 3 illustrates a wind chime in a retracted position.

FIG. 3 illustrates a wind chime 300 in a retracted condition. Wind chime 300 may include a connection point 323 to enable wind chime 300 to be secured to a structure. Wind chime 300 may include a suspension element 321 for providing structure for the other elements of wind chime 300. A cord retractor 322 may be secured directly or indirectly to suspension element 321. Chime tubes 324 may be secured to suspension element 321 by one or more tube strings 325. A center cord 326 may be secured to cord retractor 322 to wind up within cord retractor 322 and/or unwind from within cord retractor 322. A clapper 327 may be secured to center cord 326. A damper 328 may be secured to center cord 326. A windcatcher 229 may be secured to center cord 326.

FIG. 3 exemplifies center cord 326 in a retracted position (e.g., corresponding to wind chime 300 being in the retracted condition). In the retracted position, damper 328 may be positioned at a location along center cord 326 so as to be situated above chime tubes 324, such that damper 328 may not interfere with noise generation. In the retracted position, clapper 327 may be positioned at a location along center cord 326 so as to be situated between chime tubes 324. In the retracted position, windcatcher 329 may be positioned at a location along center cord 326 so as to be situated substantially below chime tubes 324. Thus, in this example, windcatcher 329 may be positioned at the bottom of center cord 326, clapper 327 may be positioned above windcatcher 329, and damper 328 may be positioned above clapper 327 and windcatcher 329. In this configuration the retracted position of center cord 326 corresponds to an undamped configuration wherein wind chime 300 may be allowed to produce noise generation.

A person of ordinary skill in the art will appreciate that clapper 327 and damper 328 may be positioned differently than as exemplified in FIG. 3. Clapper 327 may be positioned above damper 328 such that when center cord 326 is in a retracted position clapper 327 may be situated above chime tubes 324. In this configuration the retracted position of center cord 326 corresponds to a damped configuration wherein wind chime 300 may be prevented from noise generation.

Figure 4:
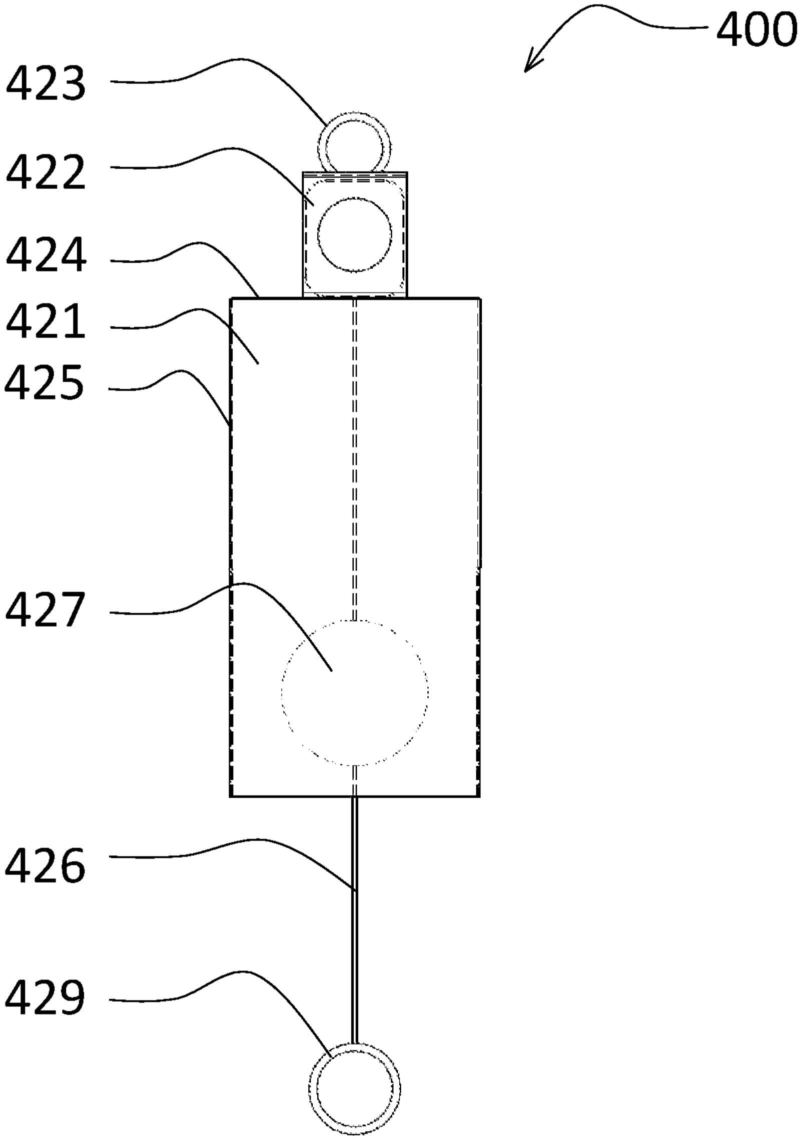
FIG. 4 illustrates a bell chime in a retracted position.

FIG. 4 illustrates a bell chime 400 in a retracted condition. Bell chime 400 may include a connection point 423 to enable bell chime 400 to be secured to a structure. Bell chime 400 may include a suspension element 421 for providing structure for the other elements of bell chime 400 (e.g., including a top wall 424 and/or a side wall 425). A cord retractor 422 may be secured to suspension element 421. Connection point 423 may be secured directly to suspension element 421, or indirectly by securement to cord retractor 422.

Suspension element 421 may include a top wall 424 for attachment of the other components of the system as disclosed herein. Suspension element 421 may include a side wall 425. Side wall 425 may be secured to top wall 424. Side wall 425 may extend downwardly from top wall 424. Top wall 424 and side wall 425 may be formed integrally. Side wall 424 may be formed as a cylindrical tube. Suspension element 421 may have a hollow interior. Suspension element 421 may have an open bottom. Top wall 424 may not experience motion relative to side wall 425 in the event of wind (e.g., wind 105 of FIG. 1) nor resulting from user interaction with bell chime 400.

While side wall 425 is exemplified as a cylindrical tube, a person of ordinary skill in the art will appreciate that other geometries are possible. In fact, the precise dimensions of side wall 425 may impact the overall tone or sound produced by bell chime 400 during use. Side wall 425 may have similar or different dimensions along its height, width, or length. The differences in dimensions may be symmetric or asymmetric. The cross-sectional shape of side wall 425 may resemble a circle, oval, square, triangle, or other polygonal shape.

Cord retractor 422 may be positioned above and/or below top wall 424 (e.g., exemplified as above in FIG. 4). A center cord 426 may be secured to cord retractor 422. Center cord 426 may wind up within cord retractor 422. Center cord 426 may unwind from within cord retractor 422. A person of ordinary skill in the art will appreciate the inner-workings of a cord retractor.

A clapper 427 may be secured to center cord 426. Clapper 427 may be formed of rigid material (e.g., metal) such that clapper 427 may strike side wall 425 to cause noise generation. Clapper 427 may be dimensioned to fit inside side wall 425 (e.g., within the hollow interior of suspension element 421) without touching side wall 425. Clapper 427 may be dimensioned to be smaller than the space between side wall 425 so that while swinging on center cord 426 clapper 427 may strike side wall 425 with enough force to generate noise (e.g., producing a tone).

A windcatcher 429 may be secured to center cord 426. Windcatcher 429 may be dimensioned to catch wind (e.g., wind 105 of FIG. 1). Upon catching wind, windcatcher 429 may begin to experience a force and may begin to move with respect to suspension element 421 (e.g., windcatcher 429 swinging as a pendulum via center cord 426). Movement of windcatcher 429 with respect to suspension element 421, and the corresponding movement of center cord 426 may also cause movement of clapper 427. Windcatcher 429 and clapper 427 may move evenly with each other during motion, or may move erratically with respect to each other during motion.

FIG. 4 exemplifies center cord 426 in a retracted position (e.g., corresponding to bell chime 400 being in the retracted condition). In the retracted position, clapper 427 may be positioned at a location along center cord 426 so as to be situated substantially within suspension element 421. In the retracted position, windcatcher 429 may be positioned at a location along center cord 426 so as to be situated substantially below suspension element 421. Thus, in this example, windcatcher 429 may be positioned at the bottom of center cord 426 and clapper 427 may be positioned above windcatcher 429. In this configuration the retracted position of center cord 426 corresponds to an undamped configuration wherein bell chime 400 may be allowed to produce noise generation.

Figure 5:
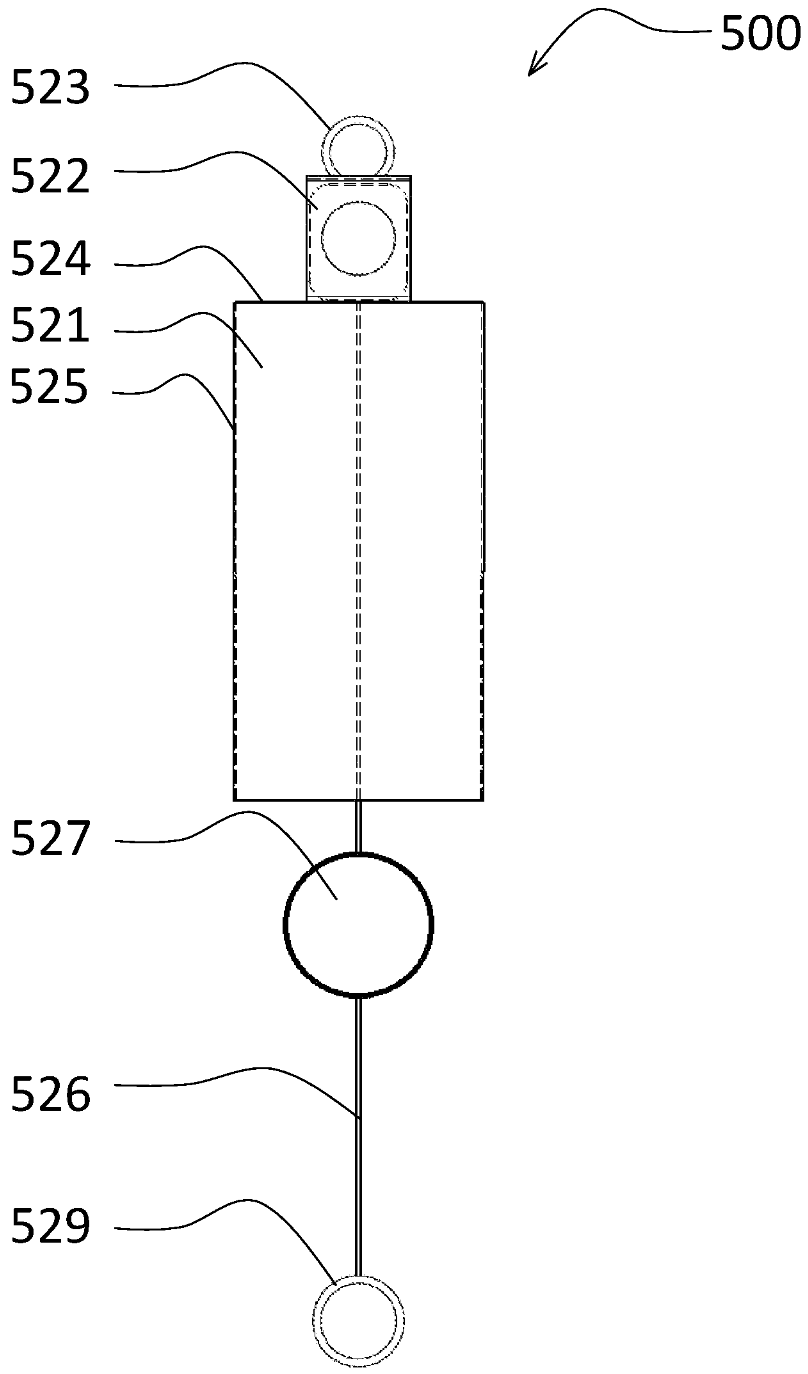
FIG. 5 illustrates a bell chime in an extended position.

FIG. 5 illustrates a bell chime 500 in an extended condition. Bell chime 500 may include a connection point 523 to enable bell chime 500 to be secured to a structure. Bell chime 500 may include a suspension element 521 having a top wall 524 for providing structure for the other elements of bell chime 500 and a side wall 525 secured to the top wall 524, and where the top wall 524 and side wall 525 may form an interior cavity with an open bottom. A cord retractor 522 may be secured to suspension element 521 and to connection point 523.

A center cord 526 may be secured to cord retractor 522 and may be configured to wind onto and unwind from cord retractor 522. A clapper 527 may be secured to center cord 526 and may strike side wall 525 to cause noise generation. Clapper 527 may be dimensioned to fit inside side wall 525 without touching side wall 525. A windcatcher 529 may be secured to center cord 526. Windcatcher 529 may be dimensioned to catch wind in order to move with respect to suspension element 521, and may further cause the movement of clapper 527.

FIG. 5 exemplifies center cord 526 in an extended position (e.g., corresponding to bell chime 500 being in the extended condition). In the extended position, clapper 527 may be positioned at a location along center cord 526 so as to be situated substantially below suspension element 521. In the extended position, windcatcher 529 may be positioned at a location along center cord 526 so as to be situated substantially below suspension element 521. Thus, in this example, windcatcher 529 may be positioned at the bottom of center cord 526 and clapper 527 may be positioned above windcatcher 529. In this configuration the extended position of center cord 526 corresponds to a damped configuration wherein bell chime 400 may be prevented from noise generation.

Other aspects will be apparent to those skilled in the art from consideration of the specification and practice disclosed herein. It is intended, therefore, that the specification and illustrated embodiments be considered as examples only.

What is claimed is:

1. A chime, comprising:
- a suspension element;
- a sound generating element extending from the suspension element;
- a cord retractor secured to the suspension element;
- a center cord secured to the cord retractor, the center cord windable and unwindable on the cord retractor between retracted and extended positions, the center cord being longer in the extended position than in the retracted position; and
- a clapper secured to the center cord.

2. The chime of claim 1, wherein the sound generating element includes one or more of a bell chime and one or more chime tubes.

3. The chime of claim 1, the chime further including a windcatcher secured to the center cord below the clapper, wherein in the retracted position the clapper is positioned near the sound generating element, and the windcatcher is positioned below the sound generating element.

4. The chime of claim 1, the chime further including a windcatcher secured to the center cord below the clapper, wherein in the extended position the clapper and the windcatcher are positioned below the sound generating element.

5. The chime of claim 1, the chime further including a windcatcher secured to the center cord below the clapper, the chime further including a damper secured to the center cord above the clapper and the windcatcher.

6. The chime of claim 5, wherein in the retracted position the damper is positioned just below the suspension element away from the sound generating element, the clapper is positioned near the sound generating element, and the windcatcher is positioned below the sound generating element.

7. The chime of claim 5, wherein in the extended position the damper is positioned near the sound generating element, and the clapper and windcatcher are positioned below the sound generating element.

8. The chime of claim 1, the chime further including a damper secured to the center cord below the clapper.

9. The chime of claim 8, wherein in the retracted position the clapper is positioned just below the suspension element away from the sound generating element, and the damper is positioned near the sound generating element.

10. The chime of claim 8, wherein in the extended position the clapper is positioned near the sound generating element, and the damper is positioned below the sound generating element.

11. A chime, comprising:
- a suspension element;
- a sound generating element extending from the suspension element;
- a cord retractor secured to the suspension element;
- a center cord secured to the cord retractor, the center cord windable and unwindable on the cord retractor between retracted and extended positions;
- a damper secured to the center cord; and
- a clapper secured to the center cord.

12. The chime of claim 11, the chime further including a windcatcher secured to the center cord below the clapper, wherein in the retracted position one of the clapper and the damper is positioned just below the suspension element away from the sound generating element, the other of the clapper and the damper is positioned near the sound generating element, and the windcatcher is positioned below the sound generating element.

13. The chime of claim 11, wherein in the extended position one of the clapper and the damper is positioned near the sound generating element, and the other of the clapper and the damper is positioned below the sound generating element.

14. The chime of claim 11, wherein the sound generating element includes one or more of a bell chime and one or more chime tubes.

15. A method for chime dampening, comprising:
- configuring a chime having:
  - a suspension element;
  - a sound generating element extending from the suspension element;
  - a cord retractor secured to the suspension element;
  - a center cord secured to the cord retractor, the center cord windable and unwindable on the cord retractor between retracted and extended positions; and
  - a clapper secured to the center cord
- moving the center cord from the retracted position to the extended position; and
- moving the center cord from the extended position to the retracted position.

16. The method of claim 15, the chime further including a windcatcher secured to the center cord below the clapper, wherein moving the center cord to the retracted position causes the clapper to be positioned near the sound generating element, and the windcatcher to be positioned below the sound generating element.

17. The method of claim 15, wherein moving the center cord to the extended position causes the clapper to be positioned below the sound generating element.

18. The method of claim 15, wherein the chime further has a damper secured to the center cord.

19. The method of claim 18, the chime further including a windcatcher secured to the center cord below the clapper, wherein moving the center cord to the retracted position causes one of the clapper and the damper to be positioned above the sound generating element, the other of the clapper and the damper to be positioned near the sound generating element, and the windcatcher to be positioned below the sound generating element.

20. The method of claim 18, wherein moving the center cord to the extended position causes one of the clapper and the damper to be positioned near the sound generating element, and the other of the clapper and the damper to be positioned below the sound generating element.

* * * * *